United States Patent [19]
Gilbreth et al.

[11] Patent Number: 6,023,135
[45] Date of Patent: Feb. 8, 2000

[54] TURBOGENERATOR/MOTOR CONTROL SYSTEM

[75] Inventors: Mark G. Gilbreth; James Brian Dickey; Charles R. Gilbreth, Jr.; Edward C. Edelman, all of Agoura Hills, Calif.

[73] Assignee: Capstone Turbine Corporation, Woodland Hills, Calif.

[21] Appl. No.: 09/080,892

[22] Filed: May 18, 1998

[51] Int. Cl.[7] ........................................................ H02P 5/20
[52] U.S. Cl. ............................ 318/140; 318/145; 318/147; 318/375; 318/811; 318/471; 290/27; 290/47; 290/52; 290/36 R
[58] Field of Search ......................................... 318/140, 145, 318/147, 375, 778, 811, 471; 290/27, 36 R, 52, 47

[56] References Cited

U.S. PATENT DOCUMENTS

| | | | |
|---|---|---|---|
| 5,251,588 | 10/1993 | Tsujii et al. | 318/778 |
| 5,789,881 | 8/1998 | Egami et al. | 318/139 |
| 5,857,349 | 1/1999 | Hamaoka et al. | 317/778 |

Primary Examiner—Karen Masih
Attorney, Agent, or Firm—Albert J. Miller

[57] ABSTRACT

A turbogenerator/motor control system having a plurality of proportional integral control loops including a fuel command control loop and a current command control loop. The exhaust gas temperature of the gas turbine of the turbogenerator/motor is maintained at a constant value with stability is achieved by varying the sampling times of the different proportional integral controls within the control loops.

25 Claims, 3 Drawing Sheets

TURBOGENERATOR/MOTOR CONTROL SYSTEM

TECHNICAL FIELD

This invention relates to the general field of turbogenerator/motor controls and more particularly to an improved system for control of the gas turbine engine of a turbogenerator/motor.

BACKGROUND OF THE INVENTION

A permanent magnet generator/motor generally includes a rotor assembly having a plurality of equally spaced magnet poles of alternating polarity around the outer periphery of the rotor or, in more recent times, a solid structure of samarium cobalt or neodymium-iron-boron. The rotor is rotatable within a stator which generally includes a plurality of windings and magnetic poles of alternating polarity. In a generator mode, rotation of the rotor causes the permanent magnets to pass by the stator poles and coils and thereby induces an electric current to flow in each of the coils. Alternately, if an electric current is passed through the stator coils, the energized coils will cause the rotor to rotate and thus the generator will perform as a motor.

One of the applications of a permanent magnet generator/motor is referred to as a turbogenerator which includes a power head mounted on the same shaft as the permanent magnet generator/motor, and also includes a combustor and recuperator. The turbogenerator power head would normally include a compressor, a gas turbine and a bearing rotor through which the permanent magnet generator/motor tie rod passes. The compressor is driven by the gas turbine which receives heated exhaust gases from the combustor supplied with preheated air from recuperator.

A permanent magnet turbogenerator/motor can be utilized to provide electrical power for a wide range of utility, commercial and industrial applications. While an individual permanent magnet turbogenerator may only generate 24 to 50 kilowatts, powerplants of up to 500 kilowatts or greater are possible by linking numerous permanent magnet turbogenerator/motors together. Standby power, peak load shaving power and remote location power are just several of the potential utility applications which these lightweight, low noise, low cost, environmentally friendly, and thermally efficient units can be useful for. To meet the stringent utility requirements, particularly when the permanent magnet turbogenerator/motor is to operate as a supplement to utility power, precise control of the permanent magnet turbogenerator/motor is, however, required.

In order to start the turbogenerator/motor, electric current is supplied to the stator coils of the permanent magnet generator/motor to operate the permanent magnet generator/motor as a motor and thus to accelerate the gas turbine of the turbogenerator. During this acceleration, spark and fuel are introduced in the correct sequence to the combustor and self-sustaining gas turbine conditions are reached.

An example of a turbogenerator/motor start-up system is described in U.S. patent application Ser. No. 837,600 filed Apr. 21, 1997 by Edward C. Edelman entitled "Gas Turbine Engine with Fixed Speed Light-Off System and Method", assigned to the same assignee as this application and incorporated herein by reference.

At this point, the inverter is disconnected from the permanent magnet generator/motor, reconfigured to a controlled 50/60 hertz mode, and then either supplies regulated 50/60 hertz three phase voltage to a stand alone load or phase locks to the utility, or to other like controllers, to operate as a supplement to the utility. In this mode of operation, the power for the inverter is derived from the permanent magnet generator/motor via high frequency rectifier bridges. A microprocessor can monitor turbine conditions and control fuel flow to the gas turbine combustor.

An example of such a turbogenerator/motor control system is described in U.S. patent application Ser. No. 924,066, filed Sep. 8, 1997 by Everett R. Geis and Brian W. Peticolas entitled "Turbogenerator/Motor Controller", assigned to the same assignee as this application and incorporated herein by reference.

A typical gas turbine engine of a turbogenerator/motor operates as a constant speed. The gas turbine engine is accelerated to the maximum sustained operating speed and loaded as required. Electronic voltage regulation will maintain a constant voltage. Operating the turbogenerator/motor at a constant speed does not, however, result in maximum operating efficiency for the gas turbine engine.

SUMMARY OF THE INVENTION

The turbogenerator/motor control system of the present invention includes a microprocessor-based inverter having multiple modes of operation and a plurality of proportional integral control loops including a fuel command control loop and a current command control loop. The exhaust gas temperature of the gas turbine is maintained at a constant value with stability achieved by varying the sampling times of the different proportional integral controls within the control loops.

BRIEF DESCRIPTION OF THE DRAWINGS

Figure 1:
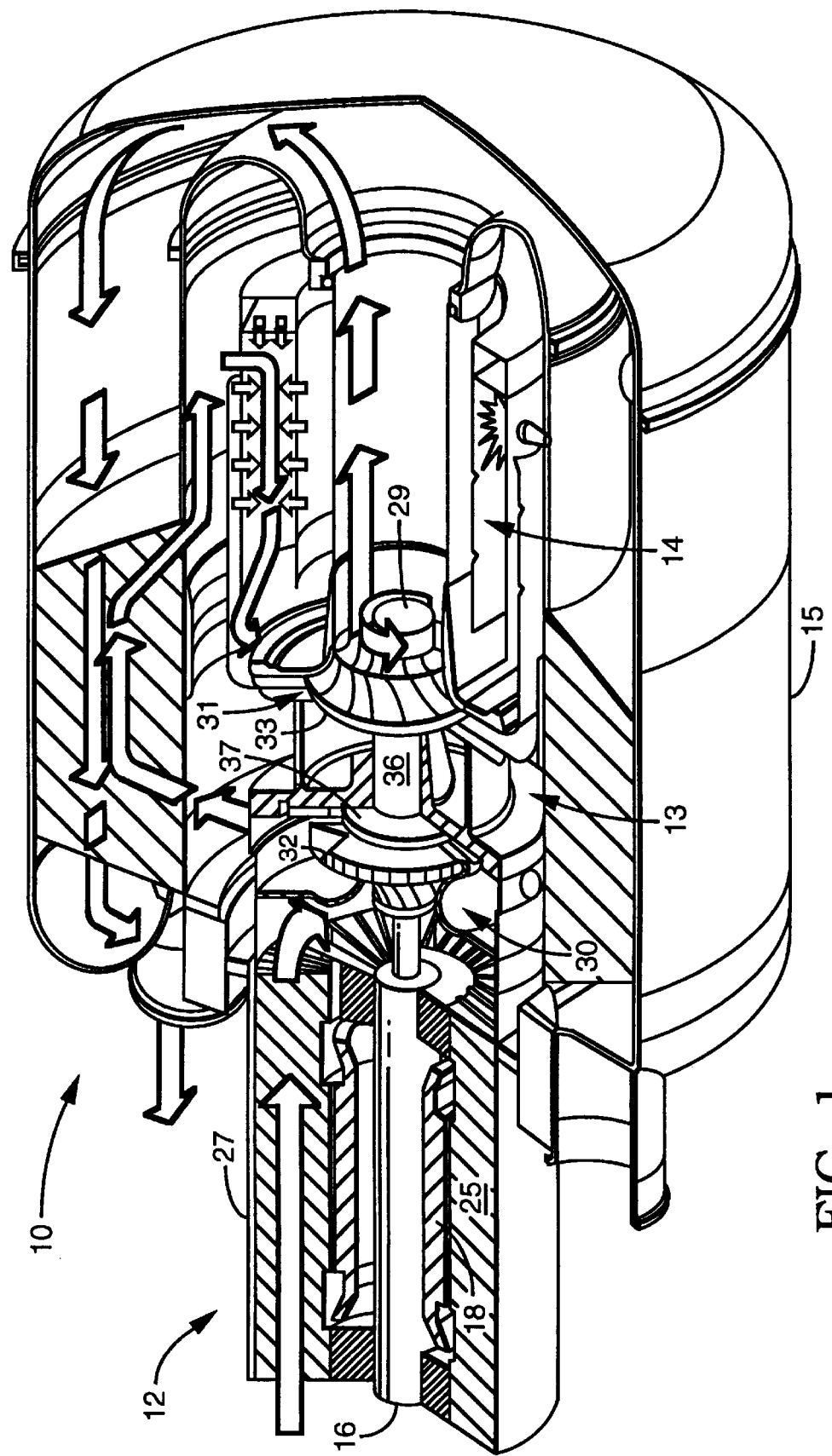
Figure 2:
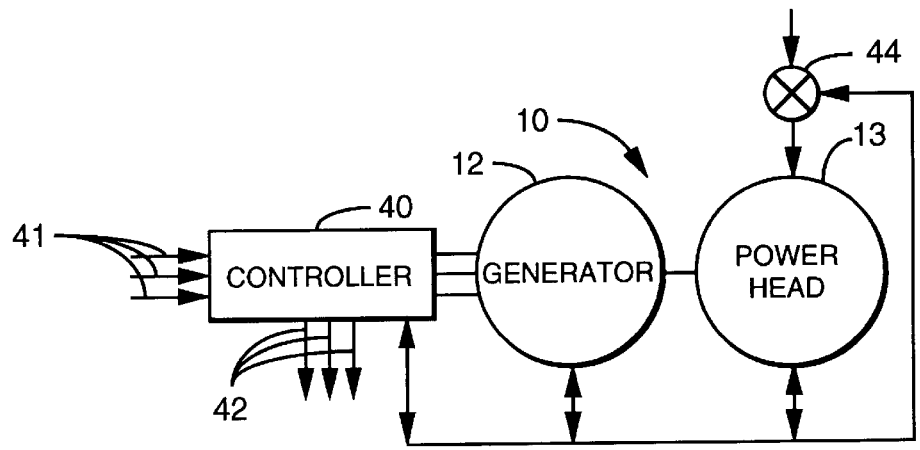
Figure 3:
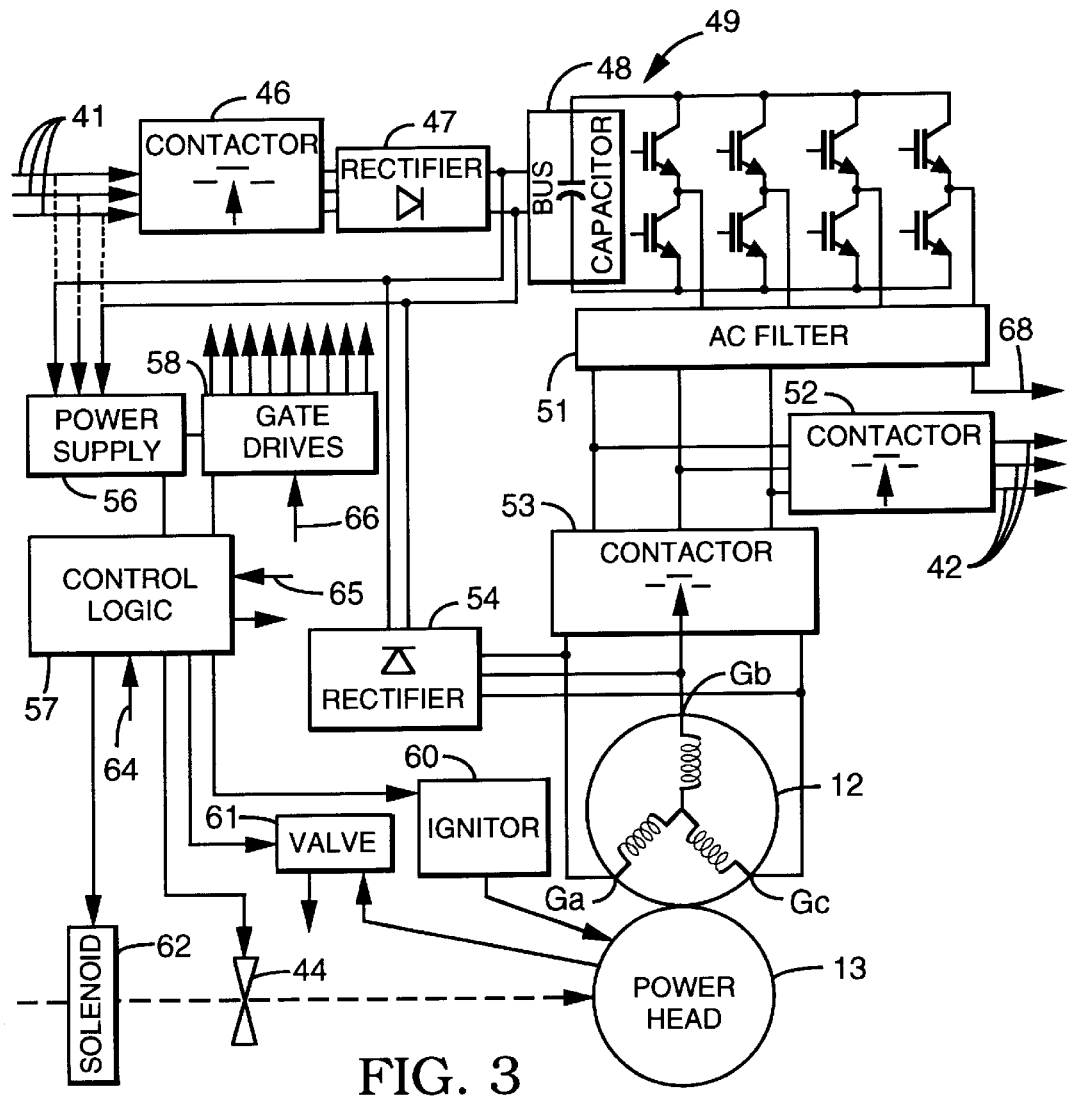
Figure 4A:
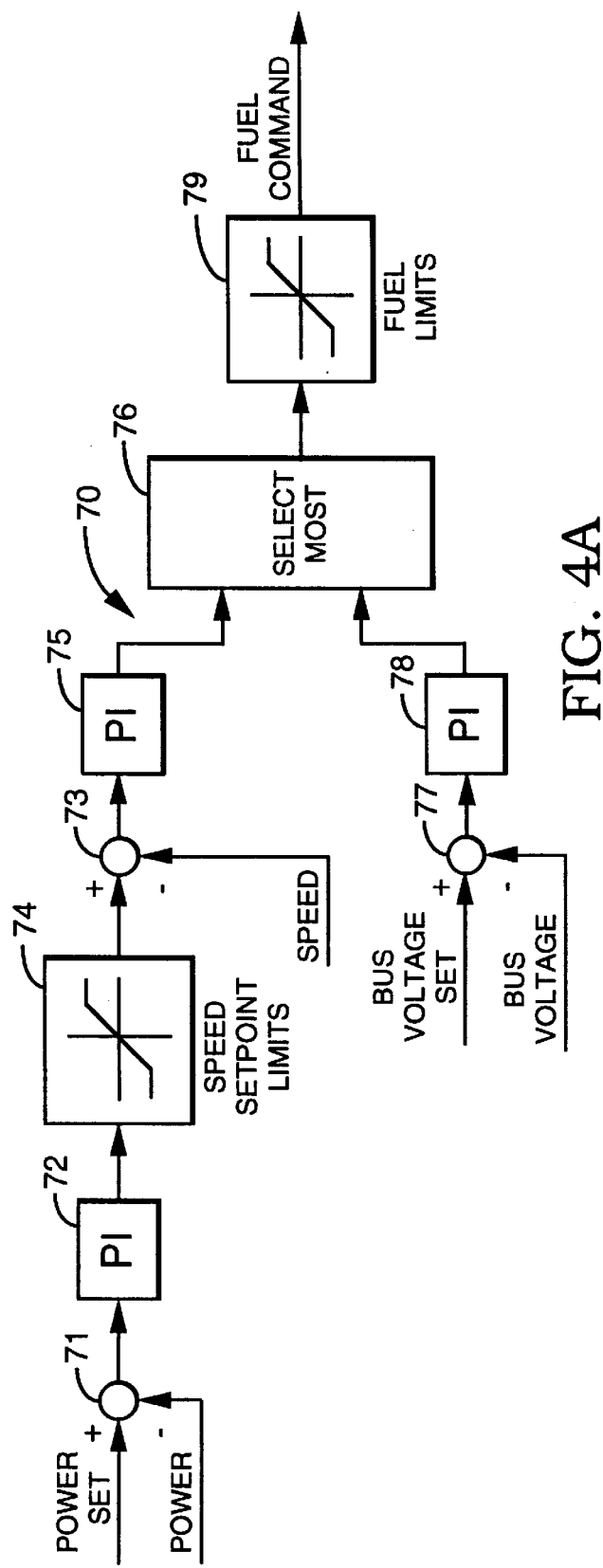
Figure 4B:
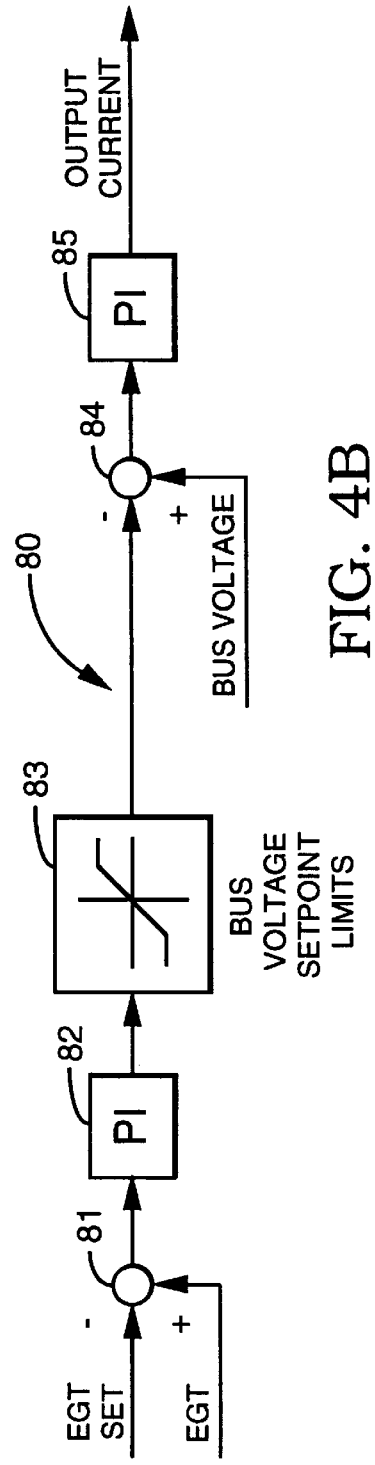

Having thus described the present invention in general terms, reference will now be made to the accompanying drawings in which:

FIG. 1 is a perspective view, partially cut away, of a permanent magnet turbogenerator/motor utilizing the gas turbine engine control system of the present invention;

FIG. 2 is a functional block diagram of the interface between the permanent magnet turbogenerator/motor of FIG. 1 and the controller including the gas turbine engine control system of the present invention;

FIG. 3 is a functional block diagram of the permanent magnet turbogenerator/motor controller including the gas turbine engine control system of the present invention;

FIG. 4a is a functional block diagram of the fuel command control loop of the gas turbine engine control system of the present invention; and FIG. 4b is a functional block diagram of the current command control loop of the gas turbine engine control system of the present invention.

DETAILED DESCRIPTION OF THE PREFERRED EMBODIMENTS

A permanent magnet turbogenerator/motor 10 is illustrated in FIG. 1 as an example of a turbogenerator/motor utilizing the gas turbine engine control system of the present invention. The permanent magnet turbogenerator/motor 10 generally comprises a permanent magnet generator 12, a power head 13, a combustor 14 and a recuperator (or heat exchanger) 15.

The permanent magnet generator 12 includes a permanent magnet rotor or sleeve 16, having a permanent magnet disposed therein, rotatably supported within a permanent magnet stator 18 by a pair of spaced journal bearings. Radial permanent magnet stator cooling fins 25 are enclosed in an outer cylindrical sleeve 27 to form an annular air flow passage which cools the permanent magnet stator 18 and thereby preheats the air passing through on its way to the power head 13.

The power head 13 of the permanent magnet turbogenerator/motor 10 includes compressor 30, gas turbine 31, and bearing rotor 36 through which the tie rod 29 passes. The compressor 30, having compressor impeller or wheel 32 which receives preheated air from the annular air flow passage in cylindrical sleeve 27 around the permanent magnet stator 18, is driven by the gas turbine 31 having turbine wheel 33 which receives heated exhaust gases from the combustor 14 supplied with air from recuperator 15. The compressor wheel 32 and turbine wheel 33 are rotatably supported by bearing shaft or rotor 36 having radially extending bearing rotor thrust disk 37. The bearing rotor 36 is rotatably supported by a single journal bearing within the center bearing housing while the bearing rotor thrust disk 37 at the compressor end of the bearing rotor 36 is rotatably supported by a bilateral thrust bearing. The bearing rotor thrust disk 37 is adjacent to the thrust face at the compressor end of the center bearing housing while a bearing thrust plate is disposed on the opposite side of the bearing rotor thrust disk 37 relative to the center housing thrust face.

Intake air is drawn through the permanent magnet generator 12 by the compressor 30 which increases the pressure of the air and forces it into the recuperator 15. In the recuperator 15, exhaust heat from the gas turbine 31 is used to preheat the air before it enters the combustor 14 where the preheated air is mixed with fuel and burned. The combustion gases are then expanded in the gas turbine 31 which drives the compressor 30 and the permanent magnet rotor 16 of the permanent magnet generator 12 which is mounted on the same shaft as the gas turbine 31. The expanded turbine exhaust gases are then passed through the recuperator 15 before being discharged from the turbogenerator/motor 10.

A functional block diagram of the interface between the generator controller 40 and the permanent magnet turbogenerator/motor 10 for stand-alone operation is illustrated in FIG. 2. The generator controller 40 receives power 41 from a source such as a utility to operate the permanent magnet generator 12 as a motor to start the turbine 31 of the power head 13. During the start sequence, the utility power 41 is rectified and a controlled frequency ramp is supplied to the permanent magnet generator 12 which accelerates the permanent magnet rotor 16 and the compressor wheel 32, bearing rotor 36 and turbine wheel 33. This acceleration provides an air cushion for the air bearings and airflow for the combustion process. At about 14,000 rpm, spark and fuel are provided and the generator controller 40 assists acceleration of the turbogenerator 10 up to a set speed of approximately 30,000 rpm to complete the start sequence. The fuel control valve 44 is also regulated by the generator controller 40 which reduces fuel to regulate the turbine exhaust gas temperature to a set value of between 600 and 900 degrees Fahrenheit.

Once this initial self-sustained operation is achieved, the permanent magnet motor is turned off and the generator controller 40 is reconfigured. For grid connect applications, output 42 is connected to input 41, and these terminals are then the single grid connection.

The generator contactor 53 connects the permanent magnet generator 12 to the inverter 49 during the start sequence. Initial starting current approximates nominal operating current for about 2 seconds then reduces to a lower value for the balance of the acceleration period. After the start sequence is completed, the generator 12 produces enough output voltage at the output terminals of the generator rectifier 54 to provide three phase regulated output from the inverter 49, so both the start contactor 46 and generator contractor are opened and the system is then self sustaining.

During startup of the permanent magnet turbogenerator/motor 10, both the start power contactor 46 and the generator contactor 53 are closed and the output contactor 52 is open. Once self sustained operation is achieved, the start power contactor 46 and the generator contactor 53 are opened and the PWM inverter 49 is reconfigured to a controlled 50/60 hertz mode. After the reconfiguration of the PWM inverter 49, the output contactor 52 is closed to connect the AC output 42. The start power contactor 46 and generator contactor 53 will remain open.

The functional blocks internal to the generator controller 40 are illustrated in FIG. 3. The generator controller 40 includes in series the start power contactor 46, rectifier 47, DC bus capacitors 48, pulse width modulated (PWM) inverter 49, AC output filter 51, output contactor 52, generator contactor 53, and permanent magnet generator 12. The generator rectifier 54 is connected from between the rectifier 47 and bus capacitors 48 to between the generator contactor 53 and permanent magnet generator 12. The AC power output 42 is taken from the output contactor 52 while the neutral is taken from the AC filter 51.

The control logic section consists of control power supply 56, control logic 57, and solid state switched gate drives illustrated as integrated gate bipolar transistor (IGBT) gate drives 58, but may be any high speed solid state switching device. The control logic 57 receives a temperature signal 64 and a current signal 65 while the IGBT gate drives 58 receive a voltage signal 66. The control logic 57 sends control signals to the fuel cutoff solenoid 62, the fuel control valve 44, the ignitor 60 and release valve 61. AC power 41 is provided to both the start power contactor 46 and in some instances directly to the control power supply 56 in the control logic section of the generator controller 40 as shown in dashed lines.

Utility start power 41, (for example, 208 AC voltage, 3 phase, 60 hertz), is connected to the start power contactor 46 through fuses (not shown). The start power contactor 46 may consist of a first normally open relay and a second normally closed relay, both of which are de-energized at start up. Alternately, both relays may be normally open and the control power supply 56 receives input directly from utility power input 41. Flameproof power resistors can parallel the relays to provide a reduced current (approximately 10 amps maximum) to slowly charge the internal bus capacitors 48 through the rectifier 47 to avoid drawing excessive inrush current from the utility.

Once the bus capacitors 48 are substantially charged, (to approximately 180 VDC, or 80% of nominal), the control power supply 56 starts to provide low voltage logic levels to the control logic 57. Once the control logic microprocessor has completed self tests, coil power is provided to first normally open relay of the start power contactor 46 to filly charge the bus capacitors 48 to fill peak line voltage. The bus capacitors 48 can be supplemented for high frequency filtering by additional film type (dry) capacitors.

The PWM inverter 49 operates in two basic modes: a variable voltage (0–190 V line to line), variable frequency (0–700 hertz) constant volts per hertz, three phase mode to drive the permanent magnet generator/motor 12 for start up or cooldown when the generator contactor 52 is closed; or a constant voltage (120 V line to neutral per phase), constant frequency three phase 50/60 hertz mode. The control logic 57 and IGBT gate drives 58 receive feedback via current signal 65 and voltage signal 66, respectively, as the turbine generator is ramped up in speed to complete the start sequence. The PWM inverter 49 is then reconfigured to provide 50/60 hertz power, either as a current source for grid connect, or as a voltage source.

The PWM inverter 49 is truly a dual function inverter which is used both to start the permanent magnet turbogenerator/motor 10 and is also used to convert the permanent magnet turbogenerator/motor output to utility power, either fifty or sixty hertz, three phase for stand alone applications, or as a current source device. With start power contactor 46 closed, single or three phase utility power is brought through the start power contactor 46 to be able to operate into a bridge rectifier 47 and provide precharged power and then start voltage to the bus capacitors 48 associated with the PWM inverter 49. This allows the PWM inverter 49 to function as a conventional adjustable speed drive motor starter to ramp the permanent magnet turbogenerator/motor 10 up to a speed sufficient to start the gas turbine 31.

An additional rectifier 54, which operates from the output of the permanent magnet turbogenerator/motor 10, accepts the three phase AC voltage from the permanent magnet generator/motor 12 which at full speed is 1600 hertz and is classified as a fast recovery diode rectifier bridge. Six diode elements arranged in a classic bridge configuration comprise this high frequency rectifier 54 which provides output power at DC.

When the PWM inverter 49 has brought the permanent magnet turbogenerator/motor 10 up to speed, the fuel solenoid 62, fuel control valve 44 and ignitor 60 cooperate to allow the combustion process to begin. Using again the adjustable speed drive portion capability of the PWM inverter 49, the permanent magnet turbogenerator/motor 10 is then accelerated to a speed at which the gas turbine 31 is capable of self-sustaining operation.

The reconfiguration or conversion of the PWM inverter 49 to be able to operate as a current source synchronous with the utility grid is accomplished by first stopping the PWM inverter 49. The AC output or the grid connect point is monitored with a separate set of logic monitoring to bring the PWM inverter 49 up in a synchronized fashion. The generator contactor 53 functions to close and connect only when the PWM inverter 49 needs to power the permanent magnet turbogenerator/motor 10 which is during the start operation and during the cool down operation. The output contactor 52 is only enabled to connect the PWM inverter 49 to the grid once the PWM inverter 49 has synchronized with grid voltage.

At self sustaining speed, the gas turbine exhaust gas temperature is limited to a maximum temperature and the permanent magnet motor turned off, fuel flow is rapidly ramped up to accelerate the gas turbine to a speed at which power can be extracted. This speed is determined by the AC voltage of the permanent magnet generator/motor 12 required to produce a minimum DC bus voltage. Minimum DC bus voltage is the voltage required to produce power through the PWM inverter 49 at the set AC output voltage on output terminals 42.

Once this selected bus voltage and corresponding speed are achieved, the generator controller 40 is reconfigured to produce 50/60 hertz, three phase AC from the rectified high frequency AC output of the high speed permanent magnet turbogenerator 10. At this point, the proportional integral control loops illustrated in FIGS. 4a and 4b control the operation of the turbogenerator. The fuel command control loop 70 of FIG. 4a includes a power comparator 71 which compares an actual power signal with a power setpoint and provides a signal to a power proportional integral control 72 having a 500 millisecond sampling time.

The output signal from this power proportional integral control 72 is provided to a speed comparator 73 through a speed setpoint limitor 74. The speed comparator 73 compares the speed setpoint with an actual speed signal and provides a signal to the speed proportional integral control 75. The signal from the speed proportional integral control 75, which has a 20 millisecond sampling time, delivers its signal to a selector 76 which also receives a signal from a minimum DC bus voltage proportional integral control 78 also having a 20 millisecond sampling time. This minimum DC bus voltage proportional integral control 78, which receives a signal from an minimum DC bus voltage comparator 77 which compares an actual bus voltage signal with a setpoint bus voltage, controls during no load operation to maintain the speed and hence the bus voltage at the minimum level that is required to be maintained. The selector 76 selects the highest value signal from either the speed proportional integral control 75 or minimum DC bus voltage proportional integral control 78 and provides it to the fuel limitor 79 which produces a fuel command signal to the fuel control valve 44.

The output current or current command control loop 80 is illustrated in FIG. 4b. Exhaust gas temperature comparator 81 compares the actual exhaust gas temperature signal with a setpoint exhaust gas temperature to provide a signal to an exhaust gas temperature proportional integral control 82 having a 60 millisecond sampling time. A bus voltage setpoint limitor 83 receives the signal from the exhaust gas temperature proportional integral control 82 and provides a signal to voltage comparator 84 which also receives an actual bus voltage signal. The signal from the voltage comparator 84 is provided to a lower bus voltage proportional integral control 85, having 1 millisecond sampling time, to produce an output current signal.

The gas turbine control system is designed to regulate the operation of the permanent magnet turbogenerator gas turbine engine with the exhaust gas temperature maintained at a constant value to allow for high efficiency over a wide range of power settings. The exhaust gas temperature is only lowered when the bus voltage hits its minimum limit and forces the exhaust gas temperature to decrease.

To increase the power output of the turbogenerator, an increased power setpoint is provided and the speed setpoint of the gas turbine is raised through the power proportional integral control 72. Fuel is then commanded (added) to raise the speed, and power output potential, of the system. Momentarily the exhaust gas temperature is increased while fuel is being added to the gas turbine. Once, however, acceleration begins and the gas turbine speed is increased, air flow through the turbine increases thereby lowering the exhaust gas temperature of the gas turbine. The exhaust gas temperature proportional integral control 82 lowers the DC bus voltage setpoint into the bus voltage comparator 84 and the power output of the turbogenerator system is increased when the lower bus voltage proportional integral control 85 commands more output current to reduce the difference in the value of the comparator 84.

To reduce the power output of the turbogenerator, a decreased power setpoint is provided and the speed setpoint of the gas turbine is decreased through the power proportional integral control 72. Fuel is then commanded (reduced) to lower the speed, and power output potential, of the system. Momentarily the exhaust gas temperature is decreased while fuel is being decreased to the gas turbine. Once, however, deceleration begins and the gas turbine speed is decreased, air flow through the turbine decreases thereby raising the exhaust gas temperature of the gas turbine. The exhaust gas temperature proportional integral control 82 increases the DC bus voltage setpoint into the bus voltage comparator 84 and the power output of the turbogenerator system is decreased when the lower bus voltage proportional integral control 85 commands less output current to reduce the difference in the value of the comparator 84.

The control loop sampling times are essential when multiple proportional integral controls are used in series. For example, the power proportional integral control 72 must respond at a slower rate to allow the speed proportional integral control 75 to achieve the current speed setpoint before a new setpoint is provided by 72. A similar example occurs with exhaust gas temperature proportional integral control 82 and lower bus voltage proportional integral control 85 are in series.

The timing between the series of proportional integral controls in FIGS. 4*a* and 4*b* is essential to stabilizing the control system. Since exhaust gas temperature has a relationship with the fuel command to the gas turbine, it must respond with an adequate amount of time to maintain the exhaust gas temperature setpoint.

The loop timing of the power proportional integral control 72 is also critical. Control is dependent on the response time of the speed and exhaust gas temperature controls, 75 and 82. The output of the gas turbine is related to the speed and temperature. Therefore these parameters must be stabilized before the power proportional integral control receives it next feedback signal.

The stability of the gas turbine control system is thus achieved by setting the sampling times of the different proportional integral controls at different times. The high sampling rate of the speed and voltage proportional integral controls allow the system to settle to a steady state before a new speed setpoint is commanded by the power proportional integral control. This effectively de-couples the interference of the power loop with the lower bus voltage loop.

The efficiency of the gas turbine engine is significantly improved by maintaining the exhaust gas temperature at a constant value. The multi-input, multi-output system effectively controls the turbogenerator operation to achieve maximum power and efficiency.

While specific embodiments of the invention have been illustrated and described, it is to be understood that these are provided by way of example only and that the invention is not to be construed as being limited thereto but only by the proper scope of the following claims.

What we claim is:

1. A method of controlling a permanent magnet turbogenerator/motor comprising the steps of:

providing electrical power to the permanent magnet turbogenerator/motor through a pulse width modulated inverter to start the permanent magnet turbogenerator/motor to achieve self-sustaining operation;

disconnecting the electrical power from the pulse width modulated inverter once self-sustaining operation is achieved;

reconfiguring the pulse width modulated inverter to supply voltage from the permanent magnet turbogenerator/motor; and maintaining the exhaust gas temperature from said permanent magnet turbogenerator/motor at a substantially constant value while supplying voltage.

2. A method of controlling a permanent magnet turbogenerator/motor comprising the steps of:

providing electrical power to the permanent magnet turbogenerator/motor through a pulse width modulated inverter to drive the permanent magnet turbogenerator/motor as a motor to accelerate the gas turbine engine of the permanent magnet turbogenerator/motor;

providing spark and fuel to the gas turbine engine of the permanent magnet turbogenerator/motor during this acceleration to achieve self-sustaining operation of the gas turbine engine;

disconnecting the electrical power from the pulse width modulated inverter once self-sustaining operation is achieved;

reconnecting the pulse width modulated inverter to the permanent magnet turbogenerator/motor through a rectifier bridge to reconfigure the pulse width modulated inverter to supply utility frequency voltage; and maintaining the exhaust gas temperature from said permanent magnet turbogenerator/motor at a substantially constant value while supplying utility frequency voltage.

3. A controller for a permanent magnet turbogenerator/motor, comprising:

a pulse width modulated inverter operably associated with said permanent magnet turbogenerator/motor;

means to provide electrical power to said permanent magnet turbogenerator/motor through said pulse width modulated inverter to start said permanent magnet turbogenerator/motor to achieve self sustaining operation;

means to disconnect the electrical power from said pulse width modulated inverter once self-sustaining operation of said permanent magnet turbogenerator/motor is achieved;

means to reconfigure said pulse width modulated inverter to supply voltage from said permanent magnet turbogenerator/motor; and means to maintain the exhaust gas temperature from said permanent magnet turbogenerator/motor at a substantially constant value while supplying voltage.

4. A controller for a permanent magnet turbogenerator/motor having a gas turbine engine, comprising:

a pulse width modulated inverter operably associated with said permanent magnet turbogenerator/motor;

means to provide electrical power to said permanent magnet turbogenerator/motor through said pulse width modulated inverter to drive said permanent magnet turbogenerator/motor as a motor to accelerate said gas turbine engine of said permanent magnet turbogenerator/motor;

means to provide spark and fuel to said gas turbine engine of said permanent magnet turbogenerator/motor during this acceleration to achieve self sustaining operation of said gas turbine engine;

means to disconnect the electrical power from said pulse width modulated inverter and said permanent magnet turbogenerator/motor once self-sustaining operation of said gas turbine engine is achieved;

a rectifier bridge operably associated with said pulse width modulated inverter and said permanent magnet turbogenerator/motor;

means to reconnect said pulse width modulated inverter to said permanent magnet turbogenerator/motor through said rectifier bridge to reconfigure said pulse width modulated inverter to supply utility frequency voltage; and means to maintain the exhaust gas temperature from said gas turbine engine of said permanent magnet turbogenerator/motor at a substantially constant value while supplying utility frequency voltage.

5. The controller for a permanent magnet turbogenerator/motor of claim 4 wherein said means to maintain the exhaust gas temperature from said gas turbine engine of said permanent magnet turbogenerator/motor at a substantially constant value while supplying utility frequency voltage includes a fuel command proportional integral control loop.

6. The controller for a permanent magnet turbogenerator/motor of claim 4 wherein said means to maintain the exhaust gas temperature from said gas turbine engine of said permanent magnet turbogenerator/motor at a substantially constant value while supplying utility frequency voltage includes a current command proportional integral control loop.

7. The controller for a permanent magnet turbogenerator/motor of claim 4 wherein said means to maintain the exhaust gas temperature from said gas turbine engine of said permanent magnet turbogenerator/motor at a substantially constant value while supplying utility frequency voltage includes a fuel command proportional integral control loop and a current command proportional integral control loop.

8. The controller for a permanent magnet turbogenerator/motor of claim 5 wherein said fuel command proportional integral control loop includes a power proportional integral control.

9. The controller for a permanent magnet turbogenerator/motor of claim 5 wherein said fuel command proportional integral control loop includes a speed proportional integral control.

10. The controller for a permanent magnet turbogenerator/motor of claim 5 wherein said fuel command proportional integral control loop includes a power proportional integral control and a speed proportional integral control.

11. The controller for a permanent magnet turbogenerator/motor of claim 10 wherein said speed proportional integral control has a higher sampling time than said power proportional integral control.

12. The controller for a permanent magnet turbogenerator/motor of claim 10 wherein said fuel command proportional integral control loop additionally includes a minimum DC bus voltage proportional integral control and a selector to select the highest signal from said speed proportional integral control and said minimum DC bus voltage proportional integral control.

13. The controller for a permanent magnet turbogenerator/motor of claim 6 wherein said current command proportional integral control loop includes an exhaust gas temperature proportional integral control.

14. The controller for a permanent magnet turbogenerator/motor of claim 6 wherein said current command proportional integral control loop includes a lower bus voltage proportional integral control.

15. The controller for a permanent magnet turbogenerator/motor of claim 6 wherein said current command proportional integral control loop includes an exhaust gas temperature proportional integral control and a lower bus voltage proportional integral control.

16. The controller for a permanent magnet turbogenerator/motor of claim 15 wherein said lower bus voltage proportional integral control has a higher sampling time than said exhaust gas temperature proportional integral control.

17. The controller for a permanent magnet turbogenerator/motor of claim 4 wherein said means to maintain the exhaust gas temperature from said gas turbine engine of said permanent magnet turbogenerator/motor at a substantially constant value while supplying utility frequency voltage includes a fuel command proportional integral control loop having a power proportional integral control and a speed proportional integral control, and a current command proportional integral control loop having an exhaust gas temperature proportional integral control and a lower bus voltage proportional integral control.

18. The controller for a permanent magnet turbogenerator/motor of claim 17 wherein said speed proportional integral control has a higher sampling time than said power proportional integral control.

19. The controller for a permanent magnet turbogenerator/motor of claim 18 wherein said fuel command proportional integral control loop additionally includes a minimum DC bus voltage proportional integral control and a selector to select the highest signal from said speed proportional integral control and said minimum DC bus voltage proportional integral control.

20. The controller for a permanent magnet turbogenerator/motor of claim 17 wherein said lower bus voltage proportional integral control has a higher sampling time than said exhaust gas temperature proportional integral control.

21. The controller for a permanent magnet turbogenerator/motor of claim 17 wherein said speed proportional integral control has a higher sampling time than said power proportional integral control, and said lower bus voltage proportional integral control has a higher sampling time than said exhaust gas temperature proportional integral control.

22. The controller for a permanent magnet turbogenerator/motor of claim 17 wherein said power proportional integral control has a lower sampling time than said exhaust gas temperature proportional integral control.

23. The controller for a permanent magnet turbogenerator/motor of claim 17 wherein said exhaust gas temperature proportional integral control has a lower sampling time than said speed proportional integral control.

24. The controller for a permanent magnet turbogenerator/motor of claim 17 wherein said speed proportional integral control has a lower sampling time than said lower bus voltage proportional integral control.

25. The controller for a permanent magnet turbogenerator/motor of claim 17 wherein said power proportional integral control has a lower sampling time than said exhaust gas temperature proportional integral control, said exhaust gas temperature proportional integral control has a lower sampling time than said speed proportional integral control, and said speed proportional integral control has a lower sampling time than said lower bus voltage proportional integral control.

* * * * *